United States Patent [19]

Schwartz

[11] 3,866,113

[45] Feb. 11, 1975

[54] TEST INSTRUMENT FOR IGNITION SYSTEMS

[75] Inventor: Edwin L. Schwartz, Los Angeles, Calif.

[73] Assignee: Rite Autotronics Corporation, Los Angeles, Calif.

[22] Filed: Aug. 6, 1973

[21] Appl. No.: 385,823

[52] U.S. Cl. ............................. 324/16 R, 324/169
[51] Int. Cl. ............................................ F02p 17/00
[58] Field of Search ............ 324/15, 16 R, 169, 170

[56] References Cited
UNITED STATES PATENTS

| | | | |
|---|---|---|---|
| 3,233,175 | 2/1966 | Faria | 324/169 |
| 3,473,119 | 10/1969 | Mazurkevics | 324/169 |
| 3,588,698 | 6/1971 | Ashcraft | 324/169 |
| 3,693,073 | 9/1972 | Colette | 324/16 R |

FOREIGN PATENTS OR APPLICATIONS

| 1,343,682 | 2/1965 | France | 324/169 |
|---|---|---|---|

Primary Examiner—Michael J. Lynch
Attorney, Agent, or Firm—Robert E. Geauque

[57] ABSTRACT

The test instrument disclosed herein is adapted for measurement of the condition of ignition systems such as those used in internal combustion engines; and is characterized by an active circuit arrangement which provides accurate measurements and which derives the supply voltage for the active elements from the circuit under measurement so that internal batteries or connections to external power sources are not required.

4 Claims, 2 Drawing Figures

TEST INSTRUMENT FOR IGNITION SYSTEMS

BACKGROUND OF THE INVENTION

This invention relates to test instruments adapted for use in the measurement and calibration of ignition systems of the type used in internal combustion engines.

Prior art instruments for testing and calibration of ignition systems have generally either been of a design which utilizes only passive elements or one which requires an internal or separate external power source.

The first type of instrument has the advantage of economy and convenience of operation inasmuch as an internal source of power and associated on-off switches are not required; nor do power leads have to be connected to an external power source. These advantages are particularly important in the normal use environment of the subject class of instruments since the convenience of merely having to connect a single pair of leads across the ignition coil (for example) without being bothered by the need for an internal instrument battery, setting on-off switches or connecting external power leads, is quite significant. However, the passive element designs heretofore used in this type of instrument are generally restricted as to their measurement accuracy.

The second type of prior art instrument which includes active element circuits, although capable of providing accurate measurements, suffers from the above outlined inconveniences associated with providing supply voltages for the active elements.

SUMMARY OF THE INVENTION

It is a primary object of the subject invention to provide an improved test instrument, adapted for use in the measurement and calibration of ignition systems, which is both accurate and convenient to use.

A further object is to provide an improved test instrument for ignition systems which provides accuracy of measurement through the use of an active circuit configuration, but which does not require internal power sources or the connection of extra leads to external power sources.

In accordance with one preferred embodiment of the subject invention, a test instrument for ignition systems is provided which incorporates a transistor, zener diode circuit arrangement for shaping a voltage signal resulting from current flow through the coil of the ignition system, so as to provide an accurate indication of a preselected characteristic of the system under test; and in which the supply voltage for the transistor, zener diode circuit arrangement is derived from the circuit under test.

The novel features of the invention are set forth with particularity in the appended claims. The invention will be best understood from the following description when read in conjunction with the accompanying drawing in which like reference characters refer to like parts.

DESCRIPTION OF THE PREFERRED EMBODIMENT

Figure 1:
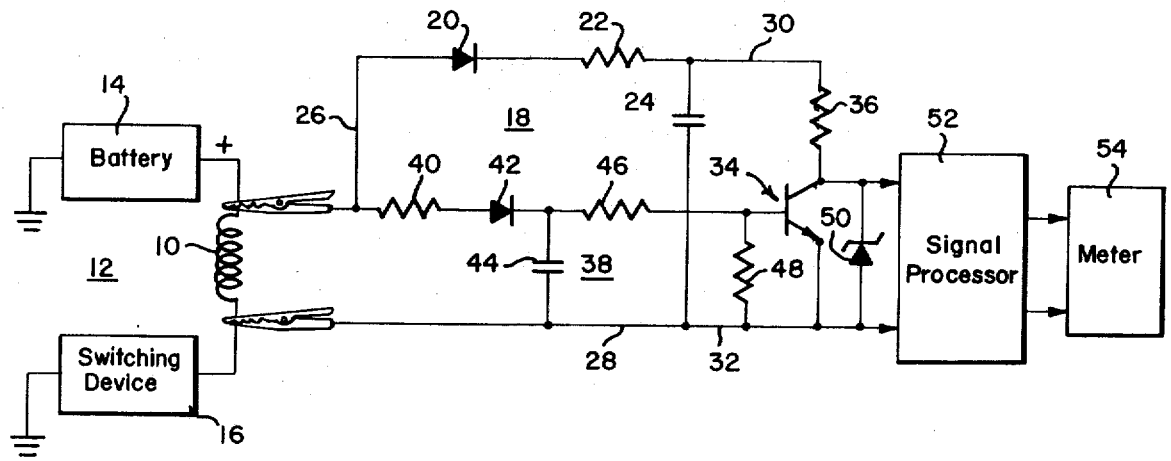
FIG. 1 is a block and schematic diagram of one preferred embodiment of a test instrument in accordance with the subject invention, coupled to an ignition system under test.

Reference is first direct primarily to FIG. 1 which shows one embodiment of the subject invention connected across the primary winding 10 of a spark coil of an ignition system 12. In the ignition system illustrated, a battery 14 is series coupled with the primary winding 10 and a switching device 16 such that pulses of current flow from the battery through the coil winding during periods a current path is provided through the switching device. Switching device 16 could include, for example, a set of contact points such as commonly found in automotive ignition systems.

A voltage supply circuit 18 includes a diode 20, a resistor 22 and a capacitor 24. Input leads 26 and 28 of circuit 18 are coupled across coil winding 10; and output leads 30 and 32 are coupled across a circuit which includes a transistor 34.

Transistor 34 has its collector terminal coupled through a resistor 36 to output lead 30 of circuit 18 and its emitter coupled to output lead 32 of circuit 18.

A base, emitter bias circuit 38 includes a resistor 40, a diode 42, a capacitor 44, and resistors 46 and 48. Resistor 40 and capacitor 44 filter the voltage signal coupled from coil winding 10, and diode 42 eliminates negative voltage portions of the signal. Resistor 46 limits the base current to transistor 48 during the "on" state of the transistor and resistor 48 provides for reverse bias of the transistor during periods the voltage across the coil is negative.

A zener diode 50 is coupled across the collector terminal of transistor 34 and output lead 32 of voltage supply circuit 18. Zener diode 50 is of such a type that the maximum voltage drop thereacross is less than the output voltage of voltage supply circuit 18. For example, if the output voltage of circuit 18 is 9 volts, diode 50 may be selected to be a 4.5 volt type zener diode.

A signal processor 52 has its input circuit coupled across zener diode 50 and provides signal current pulses at its output circuit which are indicative of a preselected operational characteristic of ignition system 12; and a meter 54 is coupled to the output circuit of signal processor 52 for providing an indication of the average value of the signal current pulses.

Figure 2:
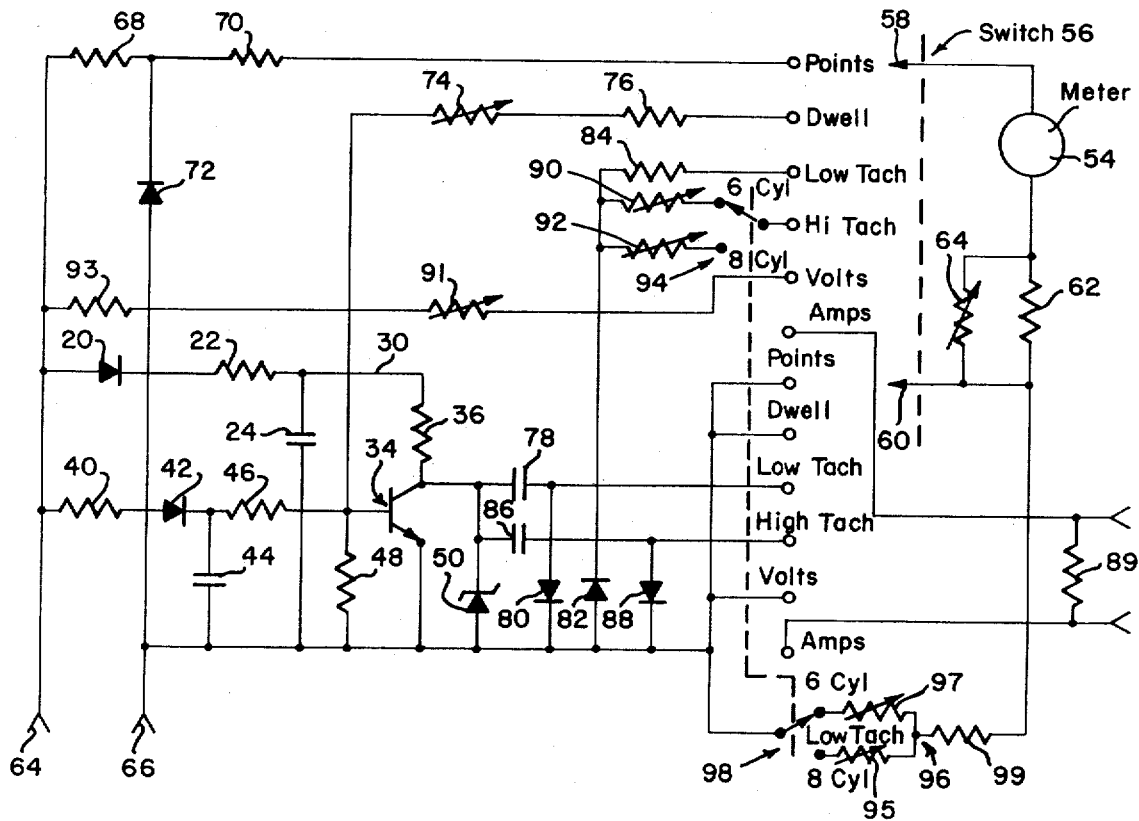
FIG. 2 is a schematic diagram of an embodiment of a test instrument in accordance with the subject invention, and in which the signal processor of FIG. 1 is shown in greater detail.

Reference is now directed to the embodiment of FIG. 2 which incorporates a signal processor for measuring the condition of the points, dwell angle and engine speed (RPM); as well as the voltage across and current through the coil winding 10, for example. A double pole, six position (throw) switch 56 is provided for selectively coupling a pair of terminals 58 and 60 to a selected pair of output terminals of the signal processor. Terminal 58 is connected to one input of meter 54 and terminal 60 to one end of the parallel combination of a resistor 62 and a potentiometer 64. The other end of the parallel combination is connected to the second input of meter 54.

When switch 56 is positioned so as to contact the terminals labeled "points" in FIG. 2, a portion of the voltage across input leads 64 and 66 is applied by means of resistors 68 and 70 to meter 54. Diode 72 prevents negative voltages from being applied to meter 54. Assuming that leads 64 and 66 are coupled across the coil winding 10 (FIG. 1), the meter reading in this position of switch 56 would be indicative of the condition of the points (not shown) of switching device 16 (FIG. 1). For example when the points are closed the voltage across coil 10 should be approximately equal to that of battery 14, if the points contacts have low "closed" resistance.

When switch 56 is positioned to contact the terminals labeled DWELL, a portion of the voltage pulses across coil 10 are applied by means of a potentiometer 74 and a resistor 76 to meter 54. The meter reading in this position of switch 56 is indicative of the percentage of the time that current pulses are applied through coil winding 10, ie DWELL angle. Elements 40, 44 and 46 provide filtering of the signal applied to potentiometer 74; and diode 42 eliminates negative portions of the signal which develops across coil winding 10.

In the next position of switch 56, labeled "LOW TACH," the reading of meter 54 is indicative of the speed of the engine (RPM) as a result of measuring the number of current pulse per unit of time applied through coil winding 10. In this mode of operation a capacitor 78 is discharged through meter 54 each time a current pulse is applied through coil winding 10. In accordance with the subject invention, the accuracy of this measurement is enhanced by the active circuit configuration which provides a constant state of charge to capacitor 78 during each cycle of operation.

As described above, capacitor 24 is charged from the signal under test to provide a DC potential for transistor 34. During periods that current pulses are not flowing in coil winding 10 the impedance between the collector and emitter terminals of transistor 34 is high (ie the transistor is baised "off") and the potential across zener diode 50 is of a fixed predetermined amplitude value determined by the type of diode, eg 4.5 volts. During this period, capacitor 78 is charged through diode 80 to the potential across zener diode 50. During periods that current pulses flow in coil winding 10, transistor 34 is biased by the base, emitter bias circuit, which includes elements 40, 42, 44, 46 and 48, so that there is a low impedance between its collector and emitter terminals, ie transistor 34 is biased on. During these periods, capacitor 78 is discharged through transistor 34, a didode 82 and a resistor 84 so as to provide signal current pulses whose average value is indicative of RPM, to meter 54.

In the "HI TACH" position of switch 56 the operation is similar to that just described for the "LOW TACH" position. A capacitor 86 is charged through a diode 88 during the off time of transistor 34, and is discharged through diode 82 and either potentiometer 90 or 92 during the on time of transistor 34. A switch 94 provides for selection of either potentiometer 90 or 92 depending upon whether the engine under test has six or eight cylinders, for example. Also a resistive network 96 is provided for further calibration of the HI TACH mode; and switch 98, which is ganged to switch 94, selects either potentiometer 97 or 95.

In the HI TACH position the parameter values are selected such that the charging and discharging time constants of capacitor 86 are substantially less than that of capacitor 78 used in the LOW TACH implementation. For example, the below listed parameters have proven satisfactory in one embodiment of the invention.

| ELEMENT | VALUE |
| --- | --- |
| 50 | 4.5 volt zener diode |
| 78 | 3.9 microfarads |
| 84 | 270 ohms |
| 54 | 40 ohms, 1 MA meter |
| 62 | 120 ohms |
| 64 | 100 ohms |
| 86 | 1.2 microfarads |
| 90 | 470 ohms |
| 92 | 470 ohms |
| 99 | 200 ohms |
| 95 | 470 ohms |
| 97 | 2200 ohms |

In the next position of the switch 56, labeled "VOLTS," the voltage applied across input leads 64 and 66 is coupled by means of resistor 93 and potentiometer 91 to the meter 54. Potentiometer 91 allows for calibration of this voltage measurement mode.

In the last position of switch 56, labeled "AMPS," provisions are included for measuring the current through leads coupled in series with a resistor 89. In this mode the meter calibration is accomplished by means of potentiometer 64.

Thus there has been described a new and useful test instrument for ignition systems which incorporates an active element circuit design for accuracy of measurement; and which derives the supply voltage for the active element from the signal test so as to not require internal batteries, or connections to external power sources.

What is claimed is:

1. In a test instrument adapted for use in the measurement of ignition systems of the type wherein a battery is series coupled with the primary winding of a spark coil and a switching device such that pulses of current flow from the battery through the coil winding during periods a current path is provided through the switching device, a circuit arrangement comprising:

voltage supply means, having an input circuit adapted for being coupled across said coil winding and having an output circuit, for converting a portion of the energy of the current pulses which flow through said coil winding into a direct current output voltage across said output circuit;

a circuit including a transistor having its collector terminal coupled through a resistor to one terminal of the output circuit of said voltage supply means; and base, emitter bias means adapted for responding to the signal across said coil winding, for biasing said transistor on during periods said current pulses are applied through said coil windings and for biasing said transistor off during other periods;

voltage level clamping means, coupled across the collector terminal of said transistor and said other terminal of the output circuit of said voltage supply means, for maintaining the voltage thereacross at a substantially fixed predetermined amplitude value during the periods said transistor is biased off;

signal processing means coupled across the collector of said transistor and said other terminal of said voltage supply means and responsive to the voltage thereacross, for providing signal current pulses whose average value is indicative of the number of current pulses per unit of time applied through said coil winding;

a meter adapted for providing an indication of the average value of current signals applied thereto; and switching means for selectively coupling said meter to receive the signal current pulses from said signal processing means, whereby an indication of the number of current pulses per unit of time applied through said coil winding is provided, and for selectively coupling said meter across the base and emitter terminals of said transistor, whereby an indication is provided of the percentage of time current pulses are applied through said coil winding.

2. The circuit arrangement of claim 1 wherein said base, emitter bias circuit means includes an input circuit adapted for being coupled across said coil winding; and an output circuit coupled across the base and emitter terminals of said transistor; and a circuit arrangement comprising a diode series coupled to a resistor-capacitor type filter circuit, intercoupled between said input and output circuits.

3. The circuit arrangement of claim 1 wherein said signal processing means includes a capacitor, means for charging said capacitor to the level of the voltage across said voltage level clamping means during periods said transistor is biased off, and for discharging said capacitor through said meter during periods said transistor is biased on.

4. The circuit arrangement of claim 1 further comprising voltage measuring means for providing an indication of the voltage drop across said coil winding and having an input circuit adapted for being coupled across said coil winding and having an output circuit selectively coupled across said meter and including a resistive scaling network and a diode arranged to provide unidirectional current flow through said meter.

* * * * *